(12) United States Patent
Randolph

(10) Patent No.: US 8,033,291 B2
(45) Date of Patent: Oct. 11, 2011

(54) MAGNETICALLY ACTIVATED CUT-OFF VALVE ASSEMBLY

(76) Inventor: Ovie L. Randolph, Dallas County, TX (US)

( * ) Notice: Subject to any disclaimer, the term of this patent is extended or adjusted under 35 U.S.C. 154(b) by 737 days.

(21) Appl. No.: 12/151,536

(22) Filed: May 7, 2008

(65) Prior Publication Data

US 2009/0277513 A1    Nov. 12, 2009

(51) Int. Cl.
*F16K 31/06* (2006.01)
*F16K 31/24* (2006.01)

(52) U.S. Cl. ........ 137/429; 137/436; 137/439; 137/448; 251/65

(58) Field of Classification Search .......... 137/400, 137/409, 429, 430, 397, 395, 381, 378, 909, 137/416, 422, 428, 389, 460, 401, 456, 391, 137/434, 436, 439, 448; 251/65
See application file for complete search history.

(56) References Cited

U.S. PATENT DOCUMENTS

| | | | | |
|---|---|---|---|---|
| 3,038,491 A | * | 6/1962 | Beazley | 137/426 |
| 3,822,933 A | * | 7/1974 | Johnson | 251/65 |
| 6,729,368 B2 | * | 5/2004 | Nguyen | 141/199 |
| 7,509,973 B1 | * | 3/2009 | Deive | 137/389 |
| 2008/0216900 A1 | * | 9/2008 | Barnham | 137/386 |

* cited by examiner

*Primary Examiner* — Stephen M Hepperle
*Assistant Examiner* — Jonathan Waddy
(74) *Attorney, Agent, or Firm* — W. Thomas Timmons

(57) ABSTRACT

A cut-off valve assembly for use with a toilet tank, includes a float within the toilet tank, a water retaining float guide within the toilet tank which allows the vertical travel of the float, the water retaining float guide having weep holes below the lowest travel of the float. The weep holes slowly release the retained water when the water in the tank is below the weep holes, a magnet within the toilet tank, affixed to the bottom of the float, and a magnetically activated cut-off valve for cutting off the water flow to the toilet tank when activated by the magnet. The magnet will activate the magnetically activated cut-off valve when the float is at the lowest travel. A preferred form of the cut-off valve assembly also includes a stem affixed to the float and extending downward from the float. The magnet is affixed to the bottom of the stem, and the magnet is affixed to the float through the stem. In a preferred form, a magnet housing is affixed to the bottom of the stem. The magnet is secured within the magnet housing, and the stem is affixed to the magnet through the magnet housing. In such an arrangement, a guide shaft is located within the water retaining float guide, for guiding the vertical movement of the magnet housing.

7 Claims, 3 Drawing Sheets

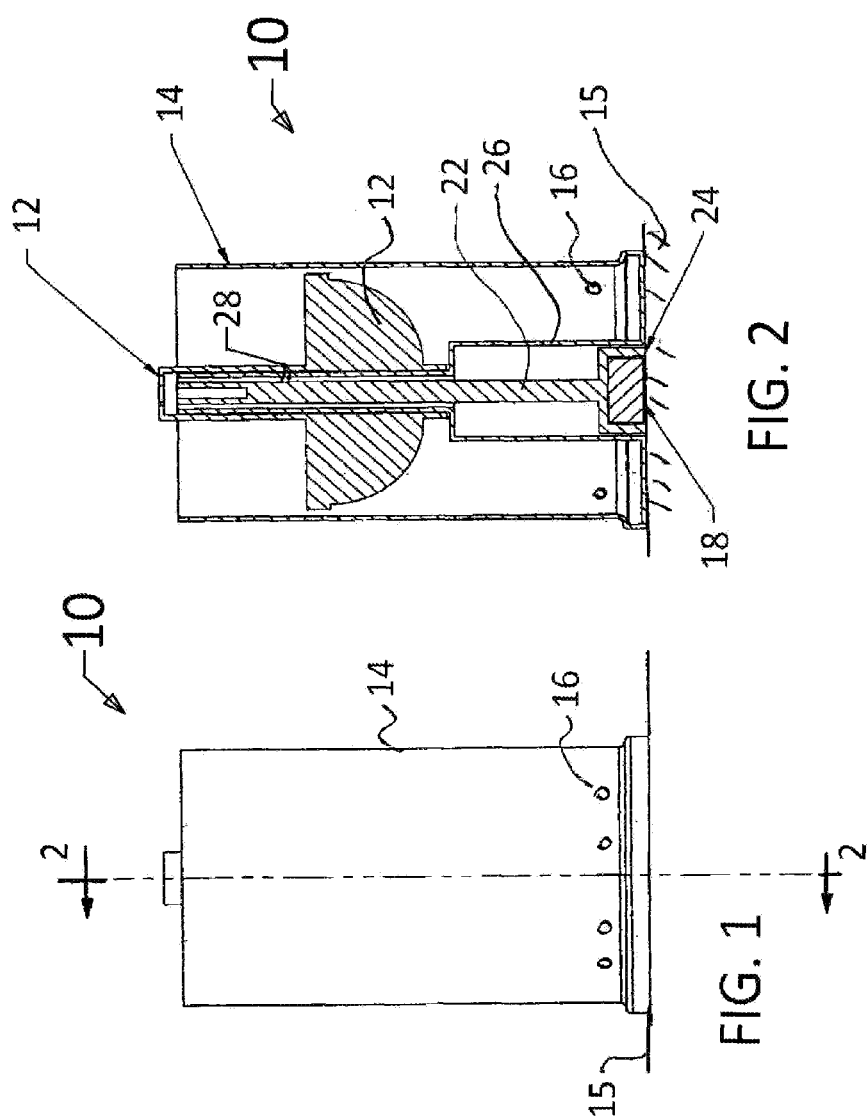

MAGNETICALLY ACTIVATED CUT-OFF VALVE ASSEMBLY

CROSS-REFERENCE TO RELATED APPLICATIONS

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates generally to the inlet or fill valve for a toilet tank and in one of its aspects to an automatic cut-off to prevent continual running of water.

2. Description of Related Art

If a tank ball or flap fails to properly seat after a toilet has been flushed, then water will continue to flow into the tank and out through the valve seat, wasting water. If someone is nearby and hears the water running, then that person can manually shut off the water or try to get the ball or flap to properly seat. Otherwise, the water will continue to run indefinitely.

BRIEF SUMMARY OF THE INVENTION

A cut-off valve assembly according to the present invention, for use with a toilet tank, includes a float within the toilet tank, a water retaining float guide within the toilet tank which allows the vertical travel of the float, the water retaining float guide having weep holes below the lowest travel of the float. The weep holes slowly release the retained water when the water in the tank is below the weep holes, a magnet within the toilet tank, affixed to the bottom of the float, and a magnetically activated cut-off valve for cutting off the water flow to the toilet tank when activated by the magnet. The magnet will activate the magnetically activated cut-off valve when the float is at the lowest travel.

A preferred form of the cut-off valve assembly also includes a stem affixed to the float and extending downward from the float. The magnet is affixed to the bottom of the stem, and the magnet is affixed to the float through the stem. In a preferred form, a magnet housing is affixed to the bottom of the stem. The magnet is secured within the magnet housing, and the stem is affixed to the magnet through the magnet housing. In such an arrangement, a guide shaft is located within the water retaining float guide, for guiding the vertical movement of the magnet housing.

In a further preferred arrangement of the cut-off valve assembly the magnetically activated cut-off valve is located below the toilet tank.

These and other objects, advantages and features of this invention will be apparent from the following description taken with reference to the accompanying drawing, wherein is shown a preferred embodiment of the invention.

BRIEF DESCRIPTION OF THE SEVERAL VIEWS OF THE DRAWING

FIG. 1 is an elevational view of a water retaining float guide according to the present invention;

FIG. 2 is a sectional view taken along 2-2 of FIG. 1, showing a float, stem, magnet housing, magnet and guide shaft, all according to the present invention and located with the water retaining float guide;

DETAILED DESCRIPTION OF THE INVENTION

Figure 3:
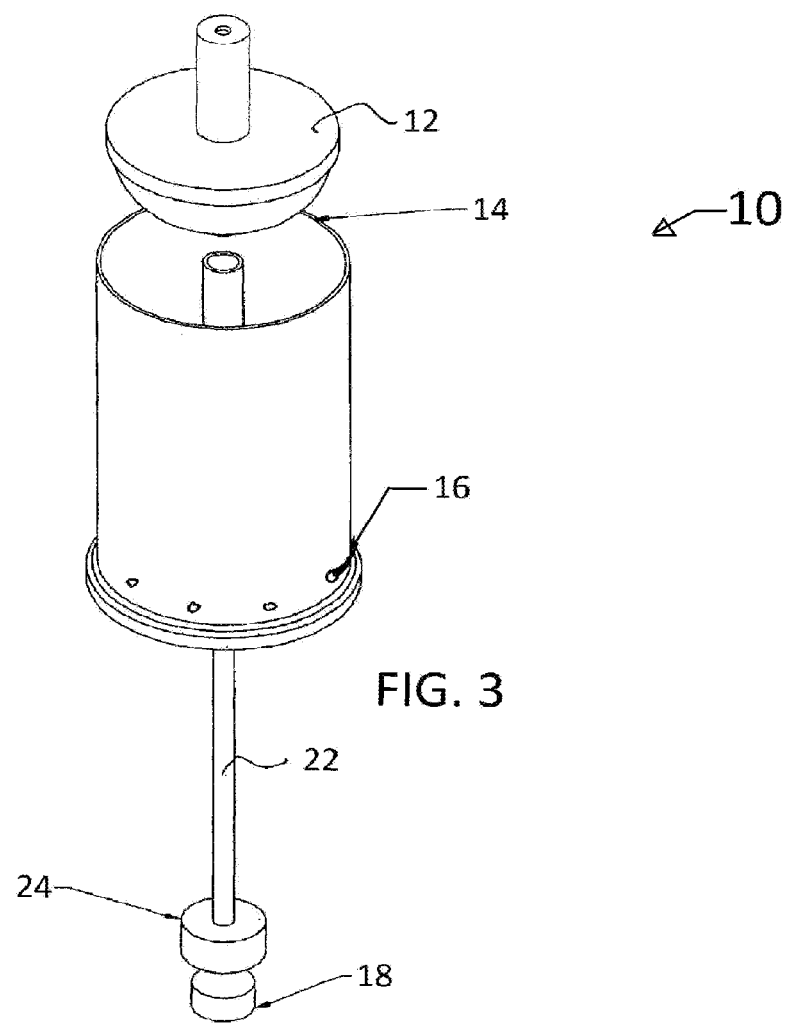
FIG. 3 is an exploded view of the water retaining float guide, float, stem, magnet housing, magnet and guide shaft according to the present invention.
Figure 4:
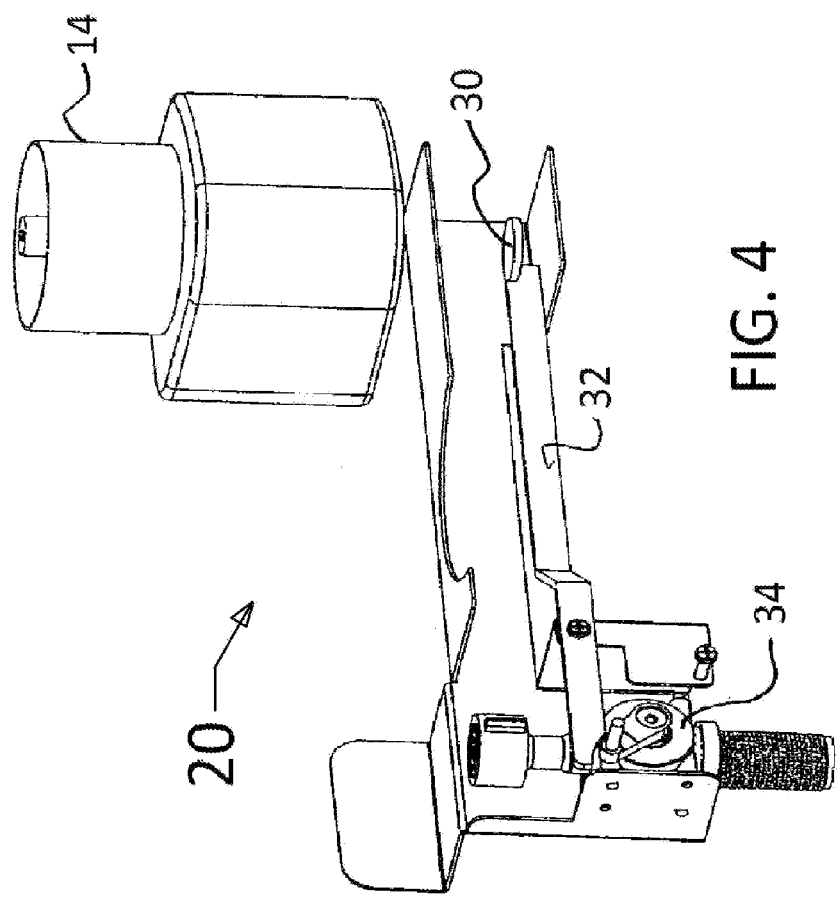
FIG. 4 is a perspective view of a magnetically activated cut-off valve according to the present invention.

Referring now to the drawing, and in particular to FIG. 1, FIG. 2 and FIG. 3, a part of a cut-off valve assembly according to the present invention which is normally located within a toilet tank is referred to generally by reference numeral 10. Assembly 10 includes a float 12 within the toilet tank, a water retaining float guide 14 within the toilet tank 15 which allows the vertical travel of float 12. Water retaining float guide 14 forms weep holes 16 below the lowest travel of float 12. Weep holes 16 slowly release the water retained in water retaining float guide 14 when the water in the tank is below the weep holes. A magnet 18 is located within the toilet tank and, in a preferred form within water retaining float guide 14. Magnet 18 is affixed to the bottom of float 12. Referring now to FIG. 4, a magnetically activated cut-off valve 20 cuts off the water flow to the toilet tank when activated by magnet 18. The magnet will activate the magnetically activated cut-off valve when the float is at the lowest travel. Magnet 18 is preferably a ceramic or metal magnet in the range of 500 to 550 gauss.

A preferred form of the cut-off valve assembly also includes a stem 22 affixed to float 12 and extending downward from the float. Magnet 18 is affixed to the bottom of stem 22, and magnet 18 is affixed to float 12 through the stem. In a preferred form, a magnet housing 24 is affixed to the bottom of stem 22. Magnet 18 is secured within magnet housing 24, and stem 22 is affixed to the magnet through the magnet housing. Magnet 18 can be affixed within magnet housing 24 by epoxy or screw or any other suitable means. In such an arrangement, a guide shaft 26 is located within water retaining float guide 14, for guiding the vertical movement of magnet housing 24. In one embodiment, a narrow portion 28 of guide shaft 26 extends up to guide stem 22. Narrow portion 28 could also be a separate guide shaft.

In a further preferred arrangement of the cut-off valve assembly, magnetically activated cut-off valve 20 is located below the toilet tank. A piece of metal 30 is pulled up by magnet 18 when magnet 18 is near the bottom of the toilet tank. This in turn lifts lever arm 32, which activates cut-off valve 34, shutting of the flow of water into the toilet tank. Thus, it can be seen that when the toilet tank is not refilling for some reason, the water in water retaining float guide 14 is slowly released through weep holes 16. This, in turn, lowers float 12, which lowers the magnet 18. If toilet tank 15 does not refill before all of the water has been drained from water retaining float guide 14, then magnet 18 eventually gets low enough to activate magnetically activated cut-off valve 20, which then shuts off the water flow into the tank.

From the foregoing it will be seen that this invention is well adapted to attain all of the ends and objectives hereinabove set forth, together with other advantages which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the figures of the accompanying drawings is to be interpreted as illustrative and not in a limiting sense.

The invention claimed is:

1. A cut-off valve assembly comprising for use with a toilet tank, in combination:
   a float within the toilet tank;
   a water retaining float guide within the toilet tank which allows the vertical travel of the float, the water retaining float guide having weep holes below the lowest travel of the float, whereby the weep holes slowly release the retained water when the water in the tank is below the weep holes;
   a magnet within the toilet tank, affixed to the bottom of the float; and
   a magnetically activated cut-off valve for cutting off the water flow to the toilet tank when activated by the magnet, wherein the magnet will activate the magnetically activated cut-off valve when the float is at the lowest travel.

2. A cut-off valve assembly according to claim 1, further comprising:
   a stem affixed to the float and extending downward from the float, wherein the magnet is affixed to the bottom of the stem, and the magnet is affixed to the float through the stem.

3. A cut-off valve assembly according to claim 2, further comprising:
   a magnet housing affixed to the bottom of the stem, wherein the magnet is secured within the magnet housing and the stem is affixed to the magnet through the magnet housing.

4. A cut-off valve assembly according to claim 3, wherein the magnetically activated cut-off valve is located below the toilet tank.

5. A cut-off valve assembly according to claim 3, further comprising:
   a guide shaft within the water retaining float guide, for guiding the vertical movement of the magnet housing.

6. A cut-off valve assembly according to claim 5, wherein the magnetically activated cut-off valve is located below the toilet tank.

7. A cut-off valve assembly according to claim 1, wherein the magnetically activated cut-off valve is located below the toilet tank.

* * * * *